July 25, 1961 C. L. WILSON 2,993,823
STRIP JOINING SYSTEM
Filed Aug. 11, 1958
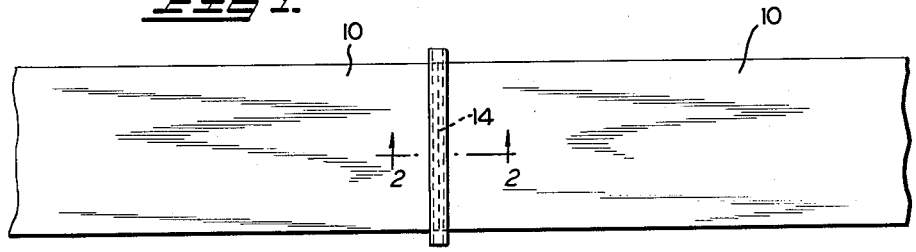
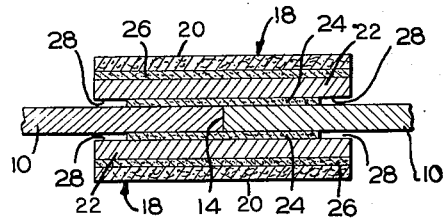
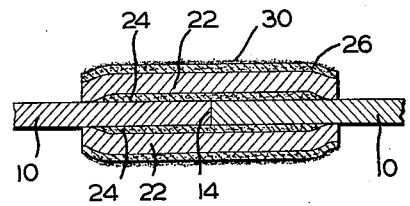
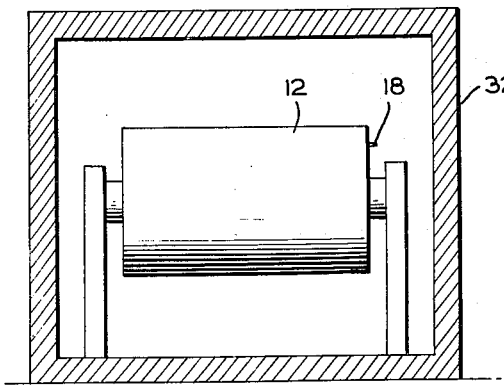
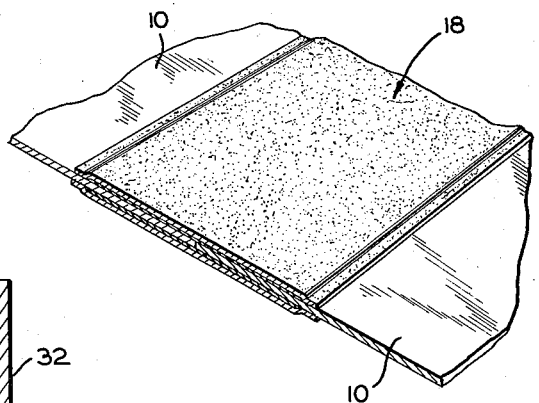
INVENTOR.
CALVIN LEROY WILSON
by his attorneys
Glenn and Jackson United States Patent Office 2,993,823
Patented July 25, 1961

2,993,823
STRIP JOINING SYSTEM
Calvin Leroy Wilson, Louisville, Ky., assignor to Reynolds Metals Company, Richmond, Va., a corporation of Delaware
Filed Aug. 11, 1958, Ser. No. 754,313
9 Claims. (Cl. 154—116)

This invention relates to splicing foil, and particularly aluminum foil strip which is subsequently wound on to a roll and annealed before being laminated and printed.

Foil strip occasionally breaks during rolling operations, and it is then conventional to trim the broken ends and splice them together in abutting relation by application of adherent tape to both sides of the break, before resuming operations. The conventional splicing tape is a ribbon of aluminum foil with adhesive on one side to grip the spliced ends of the foil strip. The roll of foil containing the splice is then usually annealed at temperatures of about 500 to 800° F., and after annealing the roll of foil is unwound preliminary to further operations, such as converting or laminating. Difficulty, including further breakage, is often encountered when the annealed roll is unwound, because of adhesion between the spliced joints and the surfaces of adjacent convolutions of the foil.

Although the foil tape is impervious to penetration by the adhesive, pressure sometimes causes the adhesive on the tape to bleed beyond the edges of the tape when the spliced strip is wound in a roll, and this small amount of adhesive is enough to stick to adjacent convolutions of the foil strip, causing the foil strip to break when the roll is unwound after the annealing operation. It is conventional to dust the spliced strip with talc in order to minimize such unwanted sticking, but this is not always effective, and the tendency of the talc to spread as much as two or three feet from the spliced joint increases the amount of scrap which must eventually be discarded when the spliced joint is cut away during final inspection.

It is also conventional to use a foil tape of relatively heavy gauge (e.g., 0.0005 inch to 0.0008 inch) in order to obtain strength and to minimize pin holing, and this, coupled with the use of two ribbons of patching foil, one on each side of the spliced joint, increases the thickness of the strip at the splice to such an extent that it creates a noticeable interference during subsequent printing operations on the foil strip after it has been unwound and laminated to paper backing material. The thickness of the splice tends to bump the printing rollers out of register as the spliced joint passes between them so that time and labor is lost in readjusting the printing machines and considerable amounts of foil must be scrapped.

In accordance with the present invention these problems are minimized or eliminated by a novel patching tape which controls migration of the necessary adhesive so that it does not cause undesirable adhesions, which is strong but of suitably limited thickness after annealing, and which employs a fugitive component which aids in controlling the adhesive and chars during the annealing operation so that the post-annealing thickness is suitably reduced.

For better understanding of the invention, reference is made to the accompanying drawing, in which there is shown, for purposes of illustration only, a present preferred embodiment of the invention. In the drawing:

FIG. 1 is a semi-diagrammatic longitudinal plan view of a strip of foil with a splice in accordance with the present invention;

FIG. 2 is an enlarged cross-sectional view of the spliced portion of the strip and taken on line 2—2 of FIG. 1;

FIG. 3 is a perspective view of a roll of foil including the splice and located in an oven for annealing;

FIG. 4 is a cross-sectional view similar to FIG. 2, but showing the spliced joint after it is annealed, and FIG. 5 is an enlarged fragmentary perspective view of the spliced portion of the annealed strip, sectioned along one side of the strip.

Referring now in detail to the drawing, a strip 10 of aluminum foil (FIG. 1) is customarily rolled in sizes of up to about 60 inches in width and varying in thickness from 0.00025 inch to 0.001 inch, and wound into a large roll 12, which is then annealed (FIG. 3) preparatory to slitting, laminating, printing and other operations. The strip is sometimes torn across its width during rolling, and the torn ends are rejoined by a splice. As shown in FIG. 1, the strip 10 is severed along the line 14 where the trimmed ends are abutted and secured together by splicing tapes 18. After splicing, the rolling and winding of the strip 10 on the roll 12 is completed, and the width of the tape 18 is preferably made greater than that of the strip to facilitate subsequent inspection of the roll, and cutting out of the splice joint where that is desired.

Two of the tapes 18 are preferably applied on opposite sides of the foil strip, as shown in FIG. 2. Each of the tapes 18 comprises an outer layer of paper or other suitable fiber tissue 20, for example, a tissue weighing eight pounds per ream, laminated to one side of a ribbon of foil 22, for example, aluminum foil of 0.00035 inch inch thickness, and a layer 24 of splicing adhesive on the other side of the foil ribbon 22. For purposes of illustration, FIGS. 2 and 4 show all of the adhesive layers with greatly exaggerated thickness.

The tissue 20 and foil 22 are bonded together by a thin layer of suitable adhesive 26 which will not bleed through the tissue, such as a conventional silicate adhesive, silicate of soda. The latter adhesive is made in base solution by mixing silica with sodium carbonate, fusing them, dissolving the mass in superheated steam and diluting to approximately 43% solids with water. The material of coating layer 26 is then made by diluting with one part water to eight parts base solution by volume.

The splicing adhesive 24 is coated on the unlaminated side of the foil ribbon 22, except for narrow marginal areas 28 along both sides of the ribbon 22, for sticking the tape to the trimmed ends 14 of the strip 10, and for maintaining adhesion after the annealing heat treatment. The adhesive-free marginal portions 28 accommodate any spreading of the adhesive and prevent seepage beyond the edges of the tape 18 when it is compressed as it passes between the rollers of the roll stands. A preferred adhesive for this purpose is composed of sixty parts by weight of silicone resin dissolved in forty parts of toluene or other solvent. Adhesives of this kind are known for their flexibility, high heat resistance, and resistance to water, and are commonly used as a varnish for coating the armature coils of electric motors.

After the foil strip has been wound into the roll 12 with the spliced joint 16 within the convolutions of the roll, the roll 12 is deposited in an annealing oven 32 (FIG. 3), and is conventionally heat treated for a period in the order of 5 to 8 hours or more at temperatures in the range of about 500 to about 800° F. The annealed roll 12 is subsequently unwound for use or further processing, such as laminating to backing paper and then printing. It has been found that by use of the special tape 18 the splice or joint does not bleed adhesive and consequently stick to adjacent convolutions of foil 10 when the roll is unwound after annealing. During annealing, the tissue layers 20 are carbonized, leaving a powdery carbon residue 30 (FIGS. 4 and 5) on the foil ribbon 22, and in the meanwhile bleeding of the tape adhesive coating 24 through any pin holes in the foil to an adjacent coil is effectively prevented. The powdery carbon residue 30 can be rubbed off, but does not spread appreciably to widen the area at the joint which should be cut out eventually, such as after printing.

The tissue layer 20 strengthens the joint during rewinding prior to annealing; and as a result of the carbonizing of the paper layer 20 during annealing, the thickness of the spliced joint is reduced to substantially the sum of the thickness of the strip 10 plus the thickness of each of the foil ribbons 22, since the thickness of the adhesive coatings is negligible. Thus, with the thickness of each tape only slightly exceeding, for example, 0.00035 inch as compared to a conventional thickness of the prior art patching tape of 0.0005 to 0.0008 inch, two tapes can be applied on opposite sides of the strip 10 and only slightly exceed the thickness of a single prior art tape of the thinner gauge and be less than a single prior art thicker tape.

Since the foil ribbons 22 are of relatively thin gauge, the spliced annealed strip is particularly useful for mounting on a paper or other light backing material preliminary to conventional printing operations. Because of the reduced thickness of the splice, after carbonization of the tissue, compared to that of conventional splices, the alignment of the printing rollers as the splice 16 passes through them is less likely to be bumped out of register.

While the present preferred embodiment and method of practicing the invention has been described and illustrated, it will be recognized that the invention may be otherwise variously embodied and practiced within the scope of the following claims.

I claim:

1. A metal foil strip having a splice, said splice comprising separated edges transversely of a metal foil strip juxtaposed in abutting relation, and at least one splicing tape extending along and overlapping said edges and adhering to one side of the strip, and said tape including a layer of metal foil laminated to a layer of paper tissue with the foil layer of the laminate disposed next to said strip.

2. A tape for use in splicing metal foil strip consisting of a layer of metal foil laminated to a layer of fibrous tissue, and a coating of adhesive on said layer of foil on the side opposite said tissue, said adhesive being capable of withstanding a temperature sufficient to anneal the strip and to carbonize said tissue.

3. A splicing tape according to claim 2 wherein said adhesive coating comprises a silicone resin dissolved in a solvent.

4. A splicing tape according to claim 2 wherein said layer of paper tissue is bonded to said layer of foil by a silicate adhesive which does not bleed through said tissue, whereby a strip spliced with said tape may be subsequently coiled into tightly wound turns which are freely unwindable.

5. A metal foil strip having a spliced joint, such joint comprising abutting trimmed ends on the foil strip, a pair of splicing tapes extending along the trimmed ends and adhering to opposite sides of the strip, each of such tapes comprising a layer of metal foil laminated to a layer of paper tissue, and said layer of foil adhering to the strip.

6. The method of splicing a metal foil strip comprising the steps of trimming the edges of a tear in said foil strip, abutting said trimmed edges, adhering the foil side of a splicing tape along said edges on at least one side of said strip, said tape comprising a layer of metal foil laminated to a layer of paper tissue, and annealing said strip and splicing tape to carbonize said layer of paper tissue.

7. A splicing tape for use in joining strips of metal foil, consisting of a layer of metal foil laminated to a layer of fibrous tissue, and a coating of adhesive disposed in a central band on the exposed surface of the foil layer, with adhesive-free areas of the foil extending along the longitudinal edges thereof, said adhesive being capable of withstanding a temperature sufficient to anneal the strip and to carbonize said tissue, whereby migration of the adhesive beyond the confines of said tape is controlled, and the spliced strip may be tightly coiled without impairing its capacity to be freely unwound.

8. The splicing tape of claim 7, wherein the tissue and adhesive are such that said tissue is impervious to said adhesive.

9. The splicing tape of claim 8 wherein said laminate includes a bonding medium which does not bleed through said tissue.

References Cited in the file of this patent

UNITED STATES PATENTS

| | | |
|---|---|---|
| 1,383,726 | Kiracofe | July 5, 1921 |
| 1,515,722 | Boyd | Nov. 18, 1924 |
| 2,017,367 | Kurz | Oct. 15, 1935 |
| 2,106,133 | Goldman | Jan. 18, 1938 |
| 2,654,684 | Heikin | Oct. 6, 1953 |
| 2,670,555 | Bostwick | Mar. 2, 1954 |
| 2,804,416 | Phillipsen | Aug. 27, 1957 |